(12) United States Patent
Pineda Amo (10) Patent No.: US 9,793,714 B2
(45) Date of Patent: Oct. 17, 2017

(54) METHODS AND ARRANGEMENTS FOR CONTROLLING POWER GENERATORS (71) Applicant: ALSTOM RENEWABLE TECHNOLOGIES, Grenoble (FR)

(72) Inventor: Isaac Pineda Amo, Sant Cugat del Valles (ES)

(73) Assignee: ALSTOM Renewable Technologies, Grenoble (FR)

( * ) Notice: Subject to any disclaimer, the term of this patent is extended or adjusted under 35 U.S.C. 154(b) by 266 days.

(21) Appl. No.: 14/762,047

(22) PCT Filed: Jan. 21, 2014

(86) PCT No.: PCT/EP2014/051151
§ 371 (c)(1),
(2) Date: Jul. 20, 2015

(87) PCT Pub. No.: WO2014/114648
PCT Pub. Date: Jul. 31, 2014

(65) Prior Publication Data
US 2015/0357819 A1 Dec. 10, 2015

Related U.S. Application Data (60) Provisional application No. 61/804,567, filed on Mar. 22, 2013.

(30) Foreign Application Priority Data

Jan. 22, 2013 (EP) .................................... 13382025

(51) Int. Cl.
H02J 3/16 (2006.01)
H02P 9/14 (2006.01)
(Continued)

(52) U.S. Cl.
CPC .............. *H02J 3/16* (2013.01); *F03D 7/0284* (2013.01); *F03D 9/257* (2017.02); *G05F 1/70* (2013.01);
(Continued)

(58) Field of Classification Search
CPC ......... H02J 3/16; H02J 3/386; Y02E 10/563; Y02E 10/723; Y02E 10/725;
(Continued)

(56) References Cited

U.S. PATENT DOCUMENTS 4,994,684 A * 2/1991 Lauw ........................ H02P 9/42
290/40 C
7,417,333 B2 * 8/2008 Miller ................... H02J 3/1871
290/44

(Continued)

FOREIGN PATENT DOCUMENTS

CN 101047315 A 10/2007
CN 102012956 A 4/2011
(Continued)

OTHER PUBLICATIONS

International Search Report and Written Opinion for PCT/EP2014/051151, mailed Feb. 25, 2014, 12 pgs.
(Continued)

*Primary Examiner* — Crystal J Barnes-Bullock
(74) *Attorney, Agent, or Firm* — Dority & Manning, P.A.

(57) ABSTRACT

Methods and arrangements for controlling the reactive power of a power generator from an initial reactive power state to a desired reactive power state are disclosed. The power generator belongs to a power farm coupled to an electrical grid. During a transition state, changes in voltage and reactive power demand are detected and control of reactive power is passed from the power farm to the power generator controller, then to a transition controller and
(Continued)

finally back to the power farm. The power generator may be a wind turbine and the power farm a wind farm.

17 Claims, 4 Drawing Sheets

(51) Int. Cl.
| | | |
|---|---|---|
| *G05F 1/70* | (2006.01) | |
| *F03D 7/02* | (2006.01) | |
| *H02J 3/18* | (2006.01) | |
| *H02J 3/38* | (2006.01) | |
| *F03D 9/25* | (2016.01) | |
| *H02P 101/15* | (2016.01) | |

(52) U.S. Cl.
CPC ............... *H02J 3/18* (2013.01); *H02J 3/386* (2013.01); *H02P 9/14* (2013.01); *H02P 2101/15* (2015.01); *Y02E 10/563* (2013.01); *Y02E 10/723* (2013.01); *Y02E 10/725* (2013.01); *Y02E 10/763* (2013.01); *Y02E 40/34* (2013.01); *Y02P 80/14* (2015.11); *Y02P 80/152* (2015.11)

(58) Field of Classification Search
CPC ..... Y02E 10/763; Y02E 40/34; F03D 7/0284; F03D 9/25; H02P 2101/15; G05F 1/70
See application file for complete search history.

(56) References Cited

U.S. PATENT DOCUMENTS

| | | | | |
|---|---|---|---|---|
| 7,447,568 | B2* | 11/2008 | Christensen | H02H 3/025 361/18 |
| 8,498,832 | B2* | 7/2013 | Venkatasubramanian | G05F 1/70 700/291 |
| 8,896,142 | B2* | 11/2014 | Arlaban Gabeiras | H02J 3/1885 290/44 |
| 8,972,068 | B2* | 3/2015 | Beck | H02J 3/16 700/286 |
| 9,002,529 | B2* | 4/2015 | Ko | H02J 3/16 322/24 |
| 9,382,898 | B2* | 7/2016 | Teodorescu | F03D 7/0284 |
| 9,484,850 | B2* | 11/2016 | Hyypio | H02P 9/14 |
| 9,531,193 | B2* | 12/2016 | Andresen | H02J 3/50 |
| 9,553,454 | B2* | 1/2017 | Beck | H02J 3/16 |
| 2012/0101640 | A1* | 4/2012 | Stapelfeldt | F03D 7/0284 700/287 |

FOREIGN PATENT DOCUMENTS

| | | |
|---|---|---|
| CN | 102738809 A | 10/2012 |
| EP | 1 512 869 | 3/2005 |
| EP | 2 317 135 | 5/2011 |
| WO | WO 2011/104270 | 9/2011 |

OTHER PUBLICATIONS

First Office Action and Search issued in connection with corresponding CN Application No. 201480005562.3 dated Apr. 24, 2017.

\* cited by examiner

METHODS AND ARRANGEMENTS FOR CONTROLLING POWER GENERATORS

This application claims the benefit of European Patent Application 13382025.8 filed on Jan. 22, 2013 and U.S. Provisional Patent Application Ser. No 61/804,567 filed 22 Mar. 2013.

The present invention relates to power generators and more specifically to methods and arrangements for controlling the reactive power of a power generator.

BACKGROUND ART

In the power industry, the term "electrical grid" is used for an electricity network which includes electricity generation, electric power transmission and electric power distribution.

Electricity generating plants or power farms are usually located away from heavily populated areas and are usually quite large to take advantage of the economies of scale. The electric power which is generated at the power farm is stepped up to a higher voltage, at which it connects to a transmission network. The transmission network moves the generated power long distances, often across a country, and sometimes even across international boundaries, until it reaches its wholesale customer (usually the company that owns the local distribution network). Upon arrival at a substation, the power is stepped down in voltage from a transmission level voltage to a distribution level voltage. As it exits the substation, it enters the distribution wiring. Finally, upon arrival at the service location, the power is stepped down again from the distribution voltage to the required service voltage(s).

A power farm is, typically, a group of power generators in the same location used to produce electric power. A large power farm may consist of several individual power generators, and may cover an extended area of hundreds of square kilometers. An example of a power farm is a wind farm comprising a plurality of wind turbines. The wind turbines, and consequently the wind farm, may also be located offshore and connected to the grid via underwater power transmitting cables.

Utility-scale wind farms must have access to transmission lines of the electrical grid to transport energy. Wind farm developers may be obligated to install extra equipment or control systems in the wind farm to meet the technical standards set by the operator of a transmission line. Such technical standards are often referred to as "grid codes".

In certain country or region specific grid codes, such as the UK grid code, there are certain performance requirements that need to be met in order for a power park or farm to be allowed to be connected to the power grid (or simply "grid"). For power farms, compliance with the connection requirements is assessed at the interface point of the power farm. Particularly for the interface point between the power farm and the grid, the connection requirements for continuously acting automatic voltage control systems with respect to transient voltage control may be very rigorous.

For an on-load step change in Transmission Interface Point voltage, the continuously acting automatic control system may be required to respond according to the following minimum criteria:

(i) the Reactive Power output response may be required to commence within a predetermined first time period of the application of the step. In some grid codes, such as in the UK, this predetermined first time period is as low as 0.2 seconds. Furthermore, the reactive power output response may be required to progress linearly or vary from a linear characteristic as long as the MVAR seconds delivered at any time up to a second period are at least those that would result from a linear response. In the UK Grid Code, the second period is equal to 1 second.

(ii) the response may be required to be such that, for a sufficiently large step, a first percentage of the full reactive capability needs to be produced within a third period. In the case of the UK grid code, this percentage is 90% and the third period is equal to 1 second.

(iii) the magnitude of the Reactive Power output response produced within a fourth period may be required to vary linearly in proportion to the magnitude of the step change. In the case of the UK grid code, the fourth period is equal to 1 second (iv) the settling time may be required to be no greater than a fifth period from the application of the step. In the UK grid code the fifth period is equal to 2 seconds.

(v) any change in reactive power and the peak to peak magnitude of any oscillations may be required to be less than a second percentage of the change in steady state Reactive Power within this time. In the UK grid code the second percentage is 5%.

However, in some cases, communications between the power farm's automatic voltage control system and the local power generator may lag beyond the first time period. This is particularly the case for offshore wind farms where communications may have a non-deterministic character. As a result, the dead-time may be variable and long. As a consequence, if the local power generator waits for a command or signal from the power farm's automatic voltage control system to react, a reactive power demand from the wind farm controller may arrive late to the wind turbine generators and therefore a grid code requirement may not be fulfilled. Furthermore, when local control is used during a first stage and then switched to remote control after a few milliseconds, sudden and uncontrolled reactive jumps may cause instability and excessive oscillations in the wind farm's reactive power, something that goes against voltage step demands of the grid code requirements.

A possible solution would be to improve the communication infrastructure between the power farm's automatic voltage control system and the local power generator controller. However, there are cases, such as in offshore wind farms, where such an improvement may be too expensive or even technically challenging to accomplish, as a substantial portion of the communication lines would need to be underwater.

SUMMARY OF THE INVENTION

There is a need for a method and arrangement for controlling a power generator that at least partially resolves some of the above mentioned problems. It is an object of the present invention to fulfil such a need.

In a first aspect of the invention, a method of transitioning a power generator, from an initial reactive power state to a desired reactive power state is disclosed. The power generator may belong to a power farm. The power generator may include a local voltage controller. The power farm may have a central reactive power controller. The initial and desired reactive power states may be determined by the central reactive power controller.

In a first step of the method, an absolute voltage change above a first predetermined threshold at the power generator may be detected. In a second step, a transition from the initial reactive power state to a first reactive power state takes place. The reactive power generated by the power generator during the first reactive power state may be determined by the local voltage controller in response to the detected voltage change. A series of reactive power demand values may be received at the power generator sent from the central reactive power controller. Next, a received reactive power demand value may be identified as a trigger value when the absolute difference between said received reactive power demand value and a previous received reactive power demand value is above a second predetermined threshold. Then, in a next step, transitioning to a second reactive power state takes place when the trigger value is detected. The reactive power generated by the power generator at any given moment during the second reactive power state may be based on a calculation of a transition controller as a function of the last received reactive power demand value and of the value of the reactive power at the previous moment. When this calculation fulfils a predetermined criterion, then, in a next step, transitioning to the desired reactive power state may take place. The reactive power generated by the power generator during the desired reactive power state may be based on the desired reactive power demand value sent by the central reactive power controller.

An aspect of the proposed method is that it may solve the dead-time problem for voltage control in power farms with bad communications, such as wind farms without the need for communication infrastructure changes which may be particularly costly, thus saving in remote power farms or offshore wind farms. Thirdly, it may be robust as it may not need to know the dead-time value, which may be different for every voltage step change and also in every power generator. The transition may also be robust against bad-valued data samples received from the power farm. This may be the case due to wrong grid meter voltage measurements. Finally, the transition between the local reactive power controller (WT) and central reactive power controller (WF) may be smooth and progressive, avoiding jumps in the requested reactive power. This may help to fulfil any grid requirements.

In some embodiments, the transition to the first reactive power state may be initiated within a predetermined first time period. This may be of particular importance since some grid codes require action to be taken within this predetermined first time period after a reactive power demand has been dispatched from the central reactive power controller. As this predetermined first time period may be sooner than the arrival of the reactive power demand to the power generator, it is critical in those circumstances that the power generator performs some reactive action before this first milestone is reached. This requirement may be crucial for allowing a power farm to be connected to an electrical grid. In the case of the UK grid code, this predetermined first time period is equal to 0.2 seconds.

In some embodiments, the calculation may include calculating a series of error values. Each error value may be calculated as the difference between a received reactive power demand value and the current actual reactive power value. The first error value may be the difference between the trigger value and the value of the actual reactive power generated when said reactive power demand value is received during the first reactive power state. The calculation of the error value and its incorporation into the reactive power function of the transition controller, allows for a smoother transition of the actual reactive power of the power generator from the reactive power reference curve set by the power generator's controller to the reactive power demand curve of the power farm's controller. The advantage is that any errors or glitches in the received reactive power demand values are mitigated and the reactive response of the power generator may be smoother.

In some embodiments, the predetermined criterion for transitioning to the desired reactive power state is a predetermined percentage deviation of the value of the reactive power from the reactive power demand value. In certain grid codes, such as the UK grid code, this is a further requirement for power farms so that they are allowed connection to the grid. In the UK grid code the predetermined percentage deviation is 5%.

In another aspect, a device for controlling the reactive power state of a power generator during a transition period from an initial reactive power state to a desired reactive power state is disclosed. The power generator may belong to a power farm. The power generator may have a local voltage controller and a $\Delta V$ generator. The power farm may have a central reactive power controller. The initial and desired power states may be determined by the central reactive power controller.

The device may comprise a voltage change detector, coupled to the $\Delta V$ generator, for detecting an absolute voltage change at the power generator above a first predetermined threshold. In some implementations the voltage change detector may be a purpose specific circuit. In other implementations, the function of the voltage change detector may be realised with a voltage detector coupled to a programmable logical circuit that may calculate voltage changes. The logical circuit may be part of the local voltage controller.

The device may further comprise a reactive power demand change detector, coupled to the central voltage controller, for detecting a reactive power demand change above a second predetermined threshold between successive reactive power demand values sent from the central reactive power controller. In some implementations the reactive power demand change detector may be a purpose specific circuit. In other implementations, the function of the reactive power demand change detector may be realised with a reactive power demand detector coupled to a programmable logical circuit that may calculate reactive power demand changes. The logical circuit may be part of the local voltage controller.

The device may further comprise a transition controller, for determining the reactive power state of the power generator. Finally, the device may further comprise a dead-time compensator, coupled to the voltage change detector, to the reactive power demand change detector and to the transition controller, for setting the reactive power of the power generator. The dead-time compensator may be controllable by instructions received from the transition controller. The device may be integrated in the power generator's controller or may be an optional add-on to the current power generator's controller. Furthermore, a single device may serve a plurality of power generators, assuming that the power generators are close enough to avoid dead-time between the device and the power generators.

In some embodiments, the dead-time compensator may comprise means for transitioning the reactive power state of the power generator from an initial reactive power state to a first reactive power state. The reactive power generated by the power generator during the first reactive power state may be determined by the local voltage controller in response to the detected voltage change. The dead-time compensator may further comprise means for transitioning the reactive power state of the power generator from the first reactive power state to a second reactive power state. The reactive power generated by the power generator during the second reactive power state may be based on a calculation of a transition controller as a function of the received reactive power demand value and the previous value of the reactive power. The dead-time compensator may further comprise means for transitioning to the desired reactive power state when the calculation of the transition controller fulfils a predetermined criterion. The reactive power generated by the power generator during the desired reactive power state is based on the desired reactive power sent by the central reactive power controller.

In another aspect of the invention a power generator is disclosed. The power generator may comprise a device according to any of the aforementioned embodiments.

In yet another aspect of the invention such a power generator may be a wind turbine. The wind turbine may be located offshore and coupled to the grid with underwater communication cables.

Finally, in another aspect, a wind turbine farm is disclosed comprising a plurality of wind turbines according to the previous aspect.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
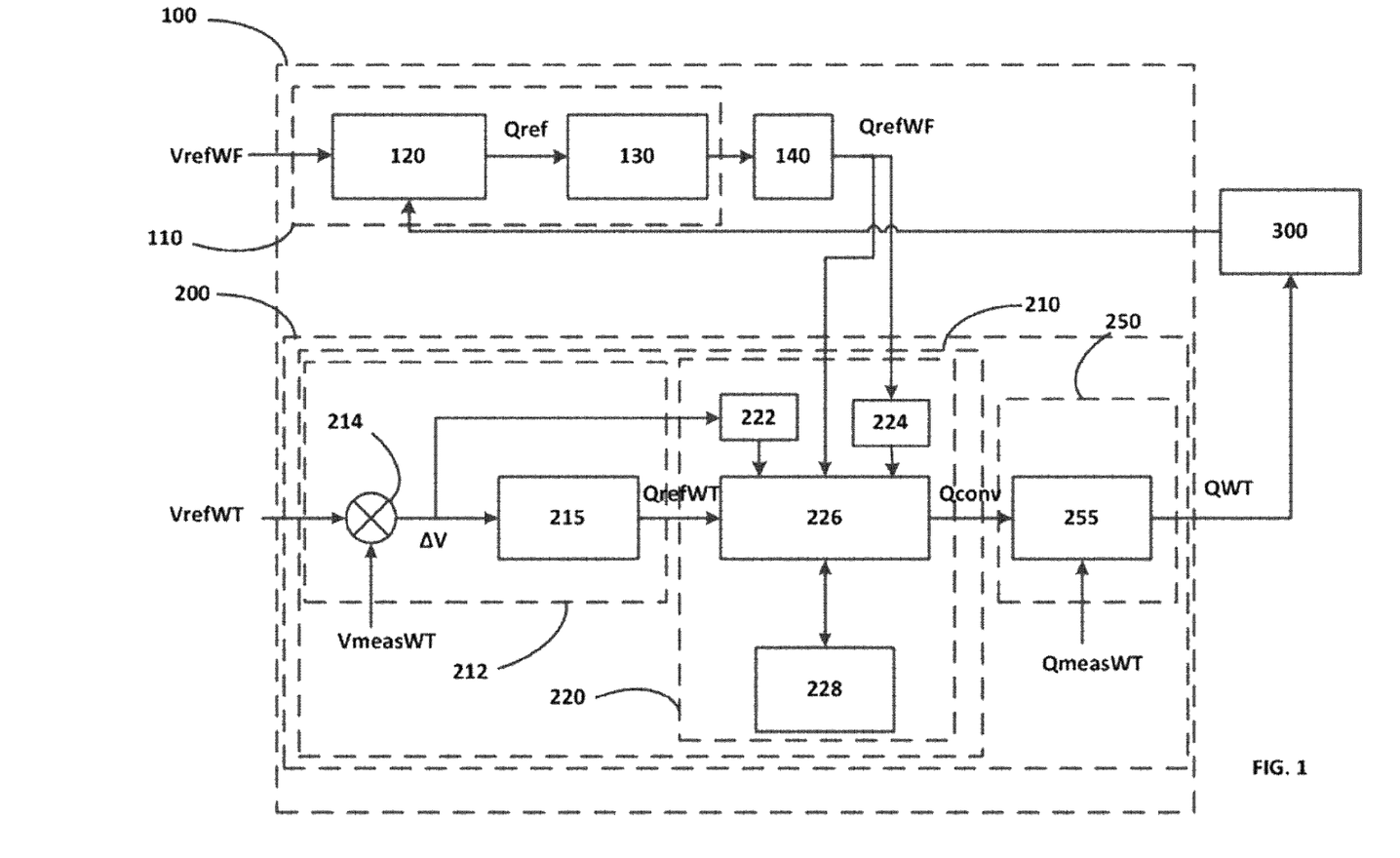
FIG. 1 is a block diagram of a power generator, according to an implementation, coupled to the central controller of a power farm.

FIG. 1 is a block diagram of a power generator, according to an implementation, coupled to the central controller of a power farm. Power farm 100 may include central reactive power controller 110 and a plurality of power generators 200. A central reactive power controller 110 may include a central main controller 120 and a distribution module 130. A communication network 140 may communicate with remote power generators. The communication network 140 may entail a certain delay between the generation of reactive power demands (QrefWF) at the central reactive power controller 110 and the reception of said demands at the power generators 200 level. Central reactive power controller 110 may also be coupled to the electrical grid 300. The central reactive power controller 110 may be coupled to the electrical grid 300 for measuring the Voltage (VmeasWF) and Reactive Power (QmeasWF) of the Power Farm 100 at the point of common coupling (PCC).

Power generator 200 may include local reactive power controller 210 and converter reactive power control loop 250. Local reactive power controller 210 may include a local voltage control loop 212 and a dynamic reactive controller 220. The local voltage control loop 212 may comprise a local voltage controller 215 and a ΔV generator 214 for generating ΔV values that correspond to deviations in the voltage as seen from the power generator. More particularly, at any given moment, the ΔV generator 214 calculates the ΔV value based on a reference voltage value (VrefWT) that corresponds to the actual reactive power generated at that moment and on a measured voltage value (VmeasWT) that is the actual voltage value as measured by the power generator. That is:

$$\Delta V = |VrefWT - VmeasWT|.$$

Dynamic reactive controller 220 may include a ΔV detector 222, a ΔQ detector 224, a dead-time compensator 226 and a transition controller 228. ΔV detector 222 may be coupled at one end to ΔV generator 214 for detecting deviations of the ΔV values beyond a predetermined threshold. At the other end, ΔV detector 222 may be coupled to the dead-time compensator 226. ΔQ detector 224 may be coupled at one end to the communication network 140 for receiving reactive power demands (QrefWF) from the central reactive power controller 110. ΔQ detector 224 may be coupled at the other end to dead-time compensator 226 for instructing the dead-time compensator 226 when a variation in the reactive power demand values above a predetermined threshold is detected.

Dead-time compensator 226 may be coupled to the transition controller 228. Transition controller 228 receives ΔV and ΔQ values from dead-time compensator 228 and determines when the dead-time compensator 226 may transition from one reactive state of operation to another. Dead time compensator 226 determines the next reactive power value (Qconv) according to the reactive state of operation and transmits this information to converter reactive power control loop 250. Converter reactive power control loop 250 may include a converter reactive power controller 255. Converter reactive power controller 255 may receive the next reactive power value (Qconv) from the dynamic reactive controller 220 and the value of the current reactive power of the power generator 200. In response, converter reactive power controller 255 sets the new reactive power of the power generator 200 that may be transferred to the electrical grid 300.

In a typical scenario, the Transmission System Operator (TSO) may send a voltage demand (VrefWF) to the power farm. The central main controller 120 may calculate the necessary reactive power (Qref) and, based on a distribution key stored in the distribution module 130, it is distributed among the available power generators as a reactive power demand (QrefWF).

Such demand will arrive at the power generators with a certain delay due to the Dead-Time. The dead-time may be unknown and may change from one voltage step demand to another, as well as from one power generator to another. E.g. the physical distance between one power generator and the central reactive power controller 110 may be very different from the physical distance between another power generator and the central reactive power controller 110.

During dead-time, the local voltage controller 215 of the power generator may define a local reactive power demand (QrefWT) to compensate for any local voltage drop or rise. Such demand may not coincide with the power farm reactive power demand, but the voltage drop is "seen" by the power generator before the power farm demand arrives.

When the power farm demand (QrefWF) arrives, the transition controller performs the following calculations:

An error value is calculated between the current actual reactive power value Qconv and the power farm demand value:

Error=QrefWF−Qconv

Then, a reactive power is computed as:

Qcomp=$Kp$*Error+$Ki$*∫Error*$dt$

The next reactive power shall then be:

Qconv=Qconv_state1+Qcomp where, Qconv_state1 is the latest Qconv value from the previous state, when the local power generator controller was in charge of the reactive power.

The values Kp and Ki may be adjusted to obtain the desired dynamics of the reactive power's transition curve. That is, it may be desired that the transition curve converges faster to the power farm's reactive power demand or it may be desired that the transition is smoother and thus slower. The various percentage thresholds and time limits may determine the range or values of Kp and Ki.

Figure 2:
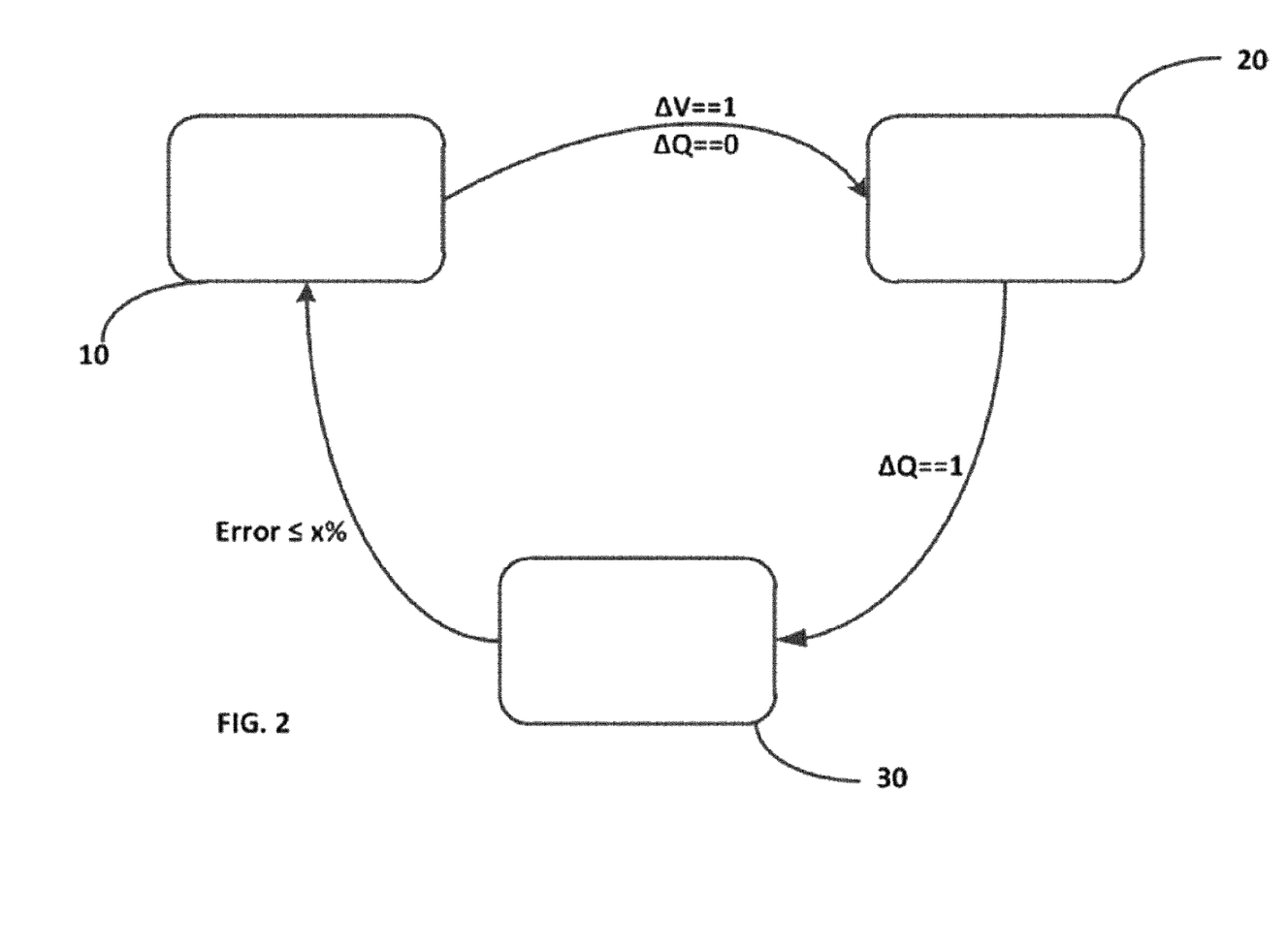
FIG. 2 is a transition diagram of the dead-time compensator of FIG. 1.

As a last step, when Error≤x % QrefWF, then control of the reactive power is handed over from the transition controller to the power farm's controller FIG. 2 is a transition diagram of the dead-time compensator of FIG. 1. Initially, in state 10, the reactive power (Qconv) of the power generator corresponds to the reactive power demand (QrefWF) sent from the power farm. During state 10, it may be assumed that the power farm's central main controller 120 controls the reactive power of the power generator.

Then, when a change in voltage above a predetermined threshold is detected at the power generator, while at the same time no significant change in the reactive power demand is detected, the dead-time compensator falls into state 20. That is, when a ΔV signal is triggered, while at the same time no ΔQ signal is present, the power generator's local reactive power controller 210 may assume control of the reactive power. In that case, the reactive power (Qconv) of the power generator corresponds to a reactive power reference (QrefWT) of the power generator.

Now, when a change in the reactive power demand sent from the power farm above a predetermined threshold is detected, the dead-time compensator falls into state 30. That is, when a ΔQ signal is triggered while the dead-time compensator is in state 20, the transition controller may assume control of the reactive power. During state 30, the reactive power (Qconv) of the power generator may correspond to a reactive power that is a function of the last received reactive power demand value and of the current actual reactive power value. The first reactive power value of the second reactive power state would be a function (i) of the reactive power demand value that triggered the change of state and (ii) of the last reactive power value that has been based on the reactive power reference of the power generator. Consequently, it may be derived that the reactive power during state 30 is a function (i) of the reactive power demand value, as received from the central main controller, and (ii) of the reactive power reference of the power generator (that is, Qconv(t)=f(QrefWF, Qconv(t−1)) where Qconv(0)= Qconv_state1).

During this state 30 the reactive power (Qconv) may be calculated using the algorithm described with reference to FIG. 1, This algorithm converges the reactive power (Qconv) towards (QrefWF) in a controlled and robust way to help fulfill the requirements of the grid code. The transition is robust against erroneously received values of power farm demand (QrefWF) samples. State 30 continues until the reactive power is within a predetermined threshold percentage from the reactive power demand $$\left( \frac{|Q_{conv} - Q_{refWT}|}{Q_{refWT}} < x \, \% \right).$$

Then, the dead-line compensator falls back to initial state 10 for a new cycle to start.

Figure 3:
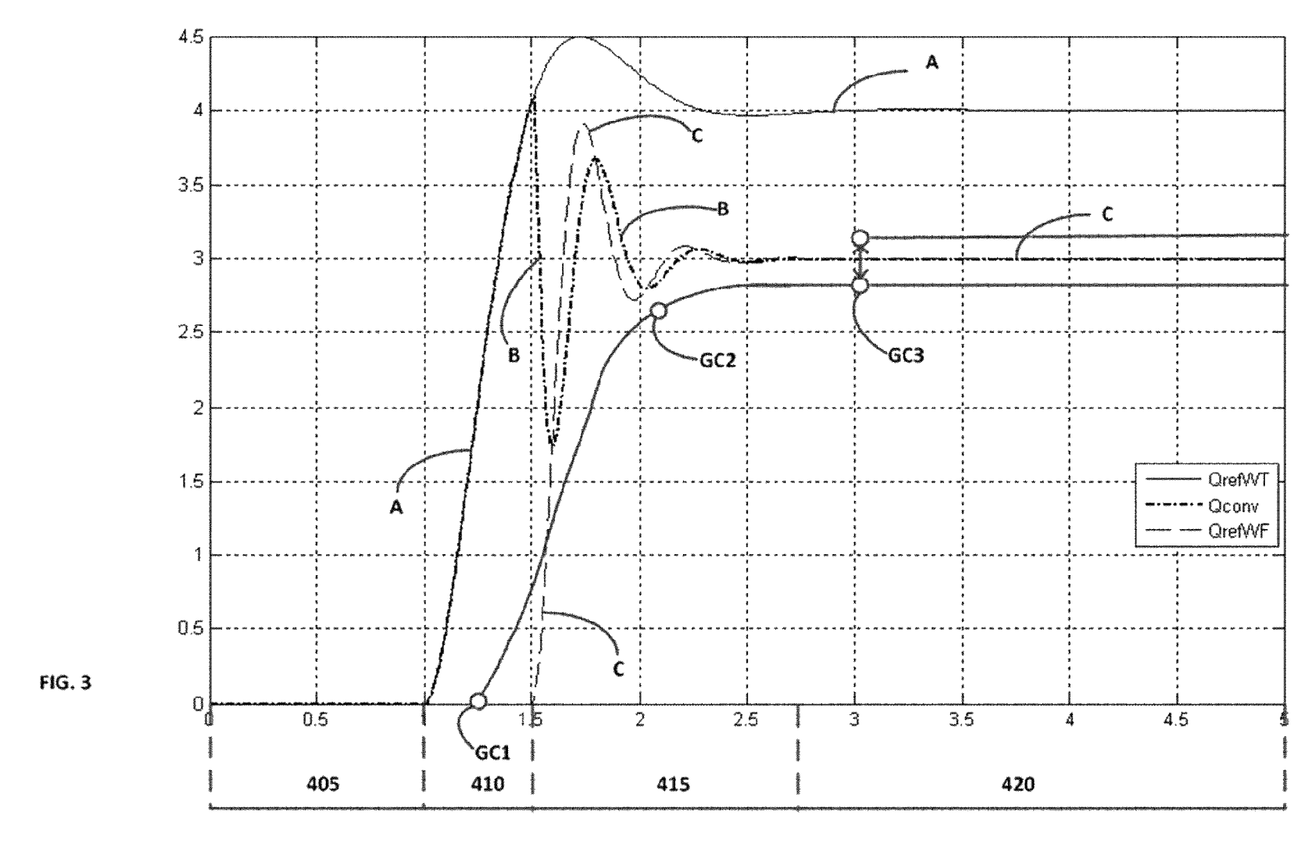
FIG. 3 is an example reactive power demand step response chart of a power generator according to the embodiment of FIG. 1.

FIG. 3 is an example reactive power demand step response chart of a power generator according to the embodiment of FIG. 1. The x axis denotes points in time measured in seconds. The y axis depicts the required increment of reactive power, with respect to a steady state reactive power generated until the voltage change is detected, in response to a sudden increment in the demand. During a first phase 405, the reactive power of the power generator is substantially based on the reactive power demand as sent by the central main controller. First phase 405 lasts until point 1 of the x axis.

Then, at point 1 sec of the x axis, a ΔV signal is detected. As a consequence, during a second phase 410, the reactive power of the power generator is substantially based on a reactive power reference (curve A) as determined by the power generator's local reactive power controller 210. Second phase 410 lasts until point 1.5 sec of the x axis. It should be noted that between point 1 sec and point 1.5 sec, there may be a point by when action is required according to a grid code when there is a change in reactive power demand above a predetermined threshold. Compliance with this requirement is necessary for power farms to be allowed to be connected to the electrical grid. This is shown as point GC1 in FIG. 3. For example, in the UK grid code this point is at 0.2 sec after point 1 sec. Therefore, by initiating action at point 1 sec, this compliance is fulfilled. Now, at point 1.5 sec, a ΔQ signal is detected. As a consequence, during a third phase 415, the reactive power of the power generator is substantially based on a reactive power function as determined by the transition controller. It may be seen from the chart of FIG. 3, that the third phase 415 starts at point 1.5 sec and ends at some point between 2.5 sec and 3 sec. During this phase, the curve of the reactive power (Qconv) (curve B) follows closely the curve of the reactive power demand (QrefWF) (curve C) but they do not coincide. This is intentional so that any glitch occurring in the reactive power demand signal during reception at the power generator may not adversely affect the system response. The third phase 415 ends when the reactive power's oscillations, as calculated by the transition controller, deviates no more than a predetermined percentage from the reactive power demand, as sent from the central reactive power controller. This predetermined percentage may be set by a grid code. In the case of the UK grid code this percentage is equal to 5%.

It may be seen in the chart of FIG. 3 that there are two further points, GC2 and GC3, which may correspond to further requirements of a grid code. Point GC2 may refer to a point in time by when a particular percentage of the final reactive power is required to be reached. In the case of the UK grid code this percentage is equal to 90%. Point GC3 may refer to a point in time by when the predetermined percentage for minimum oscillations may be reached. In the case of the UK grid code this percentage is equal to 2 seconds from point GC2. When the reactive power's oscillations, as calculated by the transition controller, deviates no more than the predetermined percentage from the reactive power demand, then the next phase, fourth phase 420 starts, where, again, the reactive power of the power generator is substantially based on the reactive power demand as sent by the power farm's central main controller.

Figure 4:
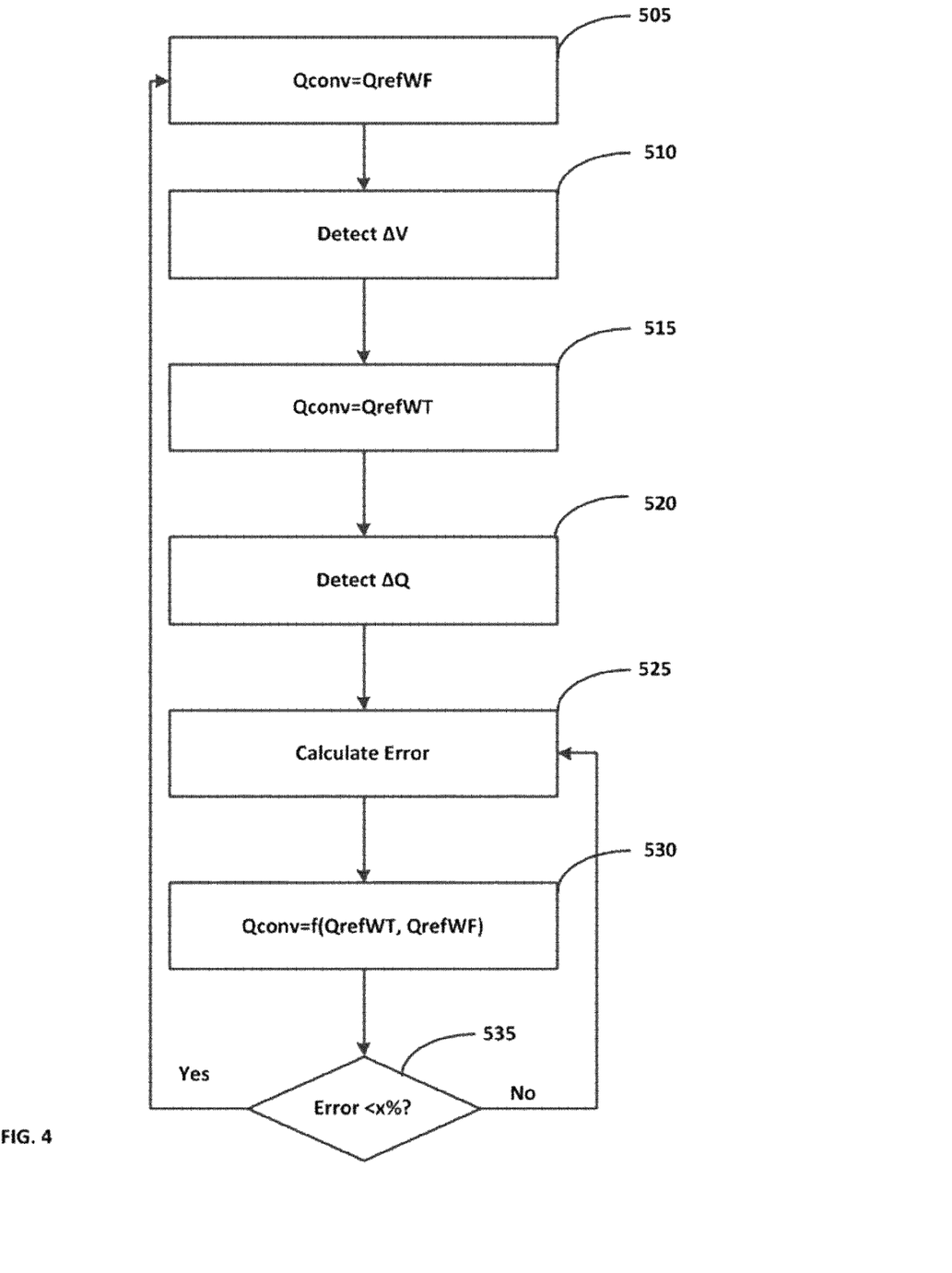
FIG. 4 shows a flow diagram of a method of controlling the reactive power of a power generator, according to an embodiment.

FIG. 4 shows a flow diagram of a method of controlling the reactive power of a power generator, according to an embodiment. Initially, the reactive power of the power generator (Qconv) is defined by the reactive power demand (QrefWF) as sent by the power farm's central main controller as seen in step 505. In a next step 510, a ΔV signal is detected above a predetermined threshold. In a third step 515, the reactive power (Qconv) is defined by the power generator's local reactive power controller and is set equal to a reactive power reference (QrefWT). In a next step 520, a ΔQ signal is detected above a predetermined value. In a further step 525, an error value is calculated as the absolute difference between the value of the current actual reactive power generated by the power generator and the reactive power demand as received by the power farm's central reactive power controller. In step 530, the reactive power (Qconv) may be defined by the transition controller as a function of the previous actual reactive power and the reactive power demand. More particularly, the reactive power when the transition controller is in charge may be defined by the following equation:

$$Q_{convt} = Q_{conv\_state1} + K_p(Q_{refWF} - Q_{conv(t-1)}) + K_i \int_0^t (Q_{refWF} - Q_{conv(t-1)}) dt$$

where, $Q_{conv\_state1}$ is the last reactive power during the first reactive power state, $Q_{refWF}$ is the reactive power demanded by the power farm, $Q_{conv(t-1)}$ is the reactive power during a previous setting step, $Q_{refWF} - Q_{conv(t-1)}$ is the error value during a current setting step, and $K_p$ and $K_i$ are constants selected to provide a desired convergence characteristic to the second power state, as the reactive power during the second power state converges towards the value of the reactive power during the desired reactive power state.

In step 535, the controller of the power generator checks if the absolute percentage error is below a predetermined threshold. If not, then the process continues from step 525. Otherwise the process continues in step 505, where the reactive power of the power generator (Qconv) is defined by the reactive power demand (QrefWF) as sent by the power farm's central main controller.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of transitioning a power generator, from an initial reactive power state to a desired reactive power state, the power generator belonging to a power farm, the power generator having a local voltage controller, the power farm having a central reactive power controller, the reactive power generated by the power generator during the initial and desired reactive power states being determined based on values of reactive power demand sent by the central reactive power controller, the method comprising the steps of:

detecting an absolute change of voltage above a predetermined voltage threshold at the power generator;

transitioning, with a dead-time compensator, the reactive power state of the power generator from the initial reactive power state to a first reactive power state, wherein the reactive power generated by the power generator during the first reactive power state is determined by the local voltage controller in response to the detected change of voltage;

receiving the values of reactive power demand at the power generator sent from the central reactive power controller, the values corresponding to demands for reactive power generation;

identifying a received value of reactive power demand as a trigger value when the absolute difference between the received value of reactive power demand and a previously received value of reactive power demand is above a predetermined reactive power threshold;

transitioning to a second reactive power state when the trigger value is detected, wherein the reactive power generated by the power generator at any given moment during the second reactive power state is set based on a calculation made by a transition controller, the calculation being a function of a last received value of reactive power demand and a value of reactive power at a previous setting moment;

transitioning to the desired reactive power state when the calculation fulfils a predetermined criterion.

2. The method according to claim 1, wherein the transition to the first reactive power state is initiated within a predetermined first time period.

3. The method according to claim 2, wherein the first time period is 0.2 sec after detecting the absolute change of voltage.

4. The method according to any of claim 1, wherein the calculation includes calculating a series of error values, each error value being calculated between a value of a received reactive power demand and the value of the current actual reactive power.

5. The method according to claim 4, wherein a first error value is the difference between the trigger value and the value of the actual reactive power generated when the value of reactive power demand is received during the first reactive power state.

6. The method according to claim 1, wherein the transitioning to the second reactive power state is initiated substantially immediately after the trigger value is received.

7. The method according to claim 6, wherein the reactive power at time t that is set within the second reactive power state period, ($Q_{convt}$), is defined by the equation:

$$Q_{convt} = Q_{conv\_state1} + K_p(Q_{refWF} - Q_{conv(t-1)}) + K_i \int_0^t (Q_{refWF} - Q_{conv(t-1)}) dt$$

wherein, $Q_{con\_state1}$ is the value of the last actual reactive power during the first reactive power state, $Q_{refWF}$ is the value of the reactive power demanded by the power farm, $Q_{cont(t-1)}$ is the reactive power during a previous setting step, $Q_{refWF}-Q_{conv(t-1)}$ is the error value during a current setting step, and $K_p$ and $K_i$ are constants selected to provide a desired convergence characteristic to the second power state, as the reactive power during the second power state converges towards the value of the reactive power demand.

8. The method according to claim 1, wherein the predetermined criterion for transitioning to the desired reactive power state is a predetermined percentage deviation of the value of the reactive power from the reactive power demand value.

9. The method according to claim 8, wherein the predetermined percentage deviation is 5%.

10. A device for controlling the reactive power state of a power generator during a transition period from an initial reactive power state to a desired reactive power state, the power generator belonging to a power farm, the power generator having a local voltage controller and a ΔV generator for generating voltage change values that correspond to deviations in voltage as seen from the power generator, the power farm having a central reactive power controller, the initial and desired power states being determined by the central reactive power controller, the device comprising:
a voltage change detector, coupled to the ΔV generator, for detecting an absolute voltage change at the power generator above a first predetermined threshold;
a reactive power demand change detector, coupled to the central reactive power controller, for detecting a reactive power demand change above a second predetermined threshold between successive reactive power demand values sent from the central reactive power controller;
a transition controller, for determining the reactive power state of the power generator;
a dead-time compensator, coupled to the voltage change detector, to the reactive power demand change detector and to the transition controller, for determining a value of the reactive power, the dead-time compensator being controllable by instructions received from the transition controller;
a converter reactive power controller coupled to the dead-time compensator for setting the reactive power of the power generator based on the value of the reactive power received from the dead-time compensator.

11. The device according to claim 10, wherein the dead-time compensator comprises:
means for transitioning the reactive power state of the power generator from an initial reactive power state to a first reactive power state, wherein the reactive power generated by the power generator during the first reactive power state is defined by the local voltage controller in response to the detected voltage change;
means for transitioning the reactive power state of the power generator from the first reactive power state to a second reactive power state, wherein the reactive power generated by the power generator during the second reactive power state is based on a calculation of a transition controller, the calculation being a function of the received reactive power demand value and a previous value of the reactive power; and
means for transitioning to the desired reactive power state when the calculation of the transition controller fulfils a predetermined criterion, whereby the reactive power generated by the power generator during the desired reactive power state is based on the desired reactive power sent by the central reactive power controller.

12. A power generator comprising:
a local voltage controller;
a ΔV generator for generating voltage change values that correspond to deviations in voltage as seen from the power generator;
a device for controlling the reactive power state of the power generator during a transition period from an initial reactive power state to a desired reactive power state, the power generator belonging to a power farm, the power farm having a central reactive power controller, the initial and desired power states being determined by the central reactive power controller, the device comprising:
a voltage change detector, coupled to the ΔV generator, for detecting an absolute voltage change at the power generator above a first predetermined threshold;
a reactive power demand change detector, coupled to the central reactive power controller, for detecting a reactive power demand change above a second predetermined threshold between successive reactive power demand values sent from the central reactive power controller;
a transition controller, for determining the reactive power state of the power generator;
a dead-time compensator, coupled to the voltage change detector, to the reactive power demand change detector and to the transition controller, for determining the value of the reactive power, the dead-time compensator being controllable by instructions received from the transition controller;
a converter reactive power controller coupled to the dead-time compensator for setting the reactive power of the power generator based on the value of the reactive power received from the dead-time compensator.

13. The power generator according to claim 12, wherein the dead-time compensator comprises:
means for transitioning the reactive power state of the power generator from an initial reactive power state to a first reactive power state, wherein the reactive power generated by the power generator during the first reactive power state is defined by the local voltage controller in response to the detected voltage change;
means for transitioning the reactive power state of the power generator from the first reactive power state to a second reactive power state, wherein the reactive power generated by the power generator during the second reactive power state is based on a calculation of a transition controller, the calculation being a function of the received reactive power demand value and a previous value of the reactive power;
means for transitioning to the desired reactive power state when the calculation of the transition controller fulfils a predetermined criterion, whereby the reactive power generated by the power generator during the desired reactive power state is based on the desired reactive power sent by the central reactive power controller.

14. The power generator according to claim 13, wherein the power generator is a wind turbine.

15. The power generator according to claim 14, wherein the power generator is an offshore wind turbine.

16. A wind turbine farm comprising a plurality of wind turbines according to claim 14.

17. A wind turbine farm comprising a plurality of wind turbines according to claim 15.

* * * * *